Nov. 1, 1966 MICHIO TAKEDA 3,282,283
HYDRAULIC REGULATING SYSTEM AND APPARATUS
Filed Dec. 23, 1963 3 Sheets-Sheet 1

INVENTOR.
MICHIO TAKEDA
BY
J. Jordan Kunik
ATTORNEY

INVENTOR.
MICHIO TAKEDA

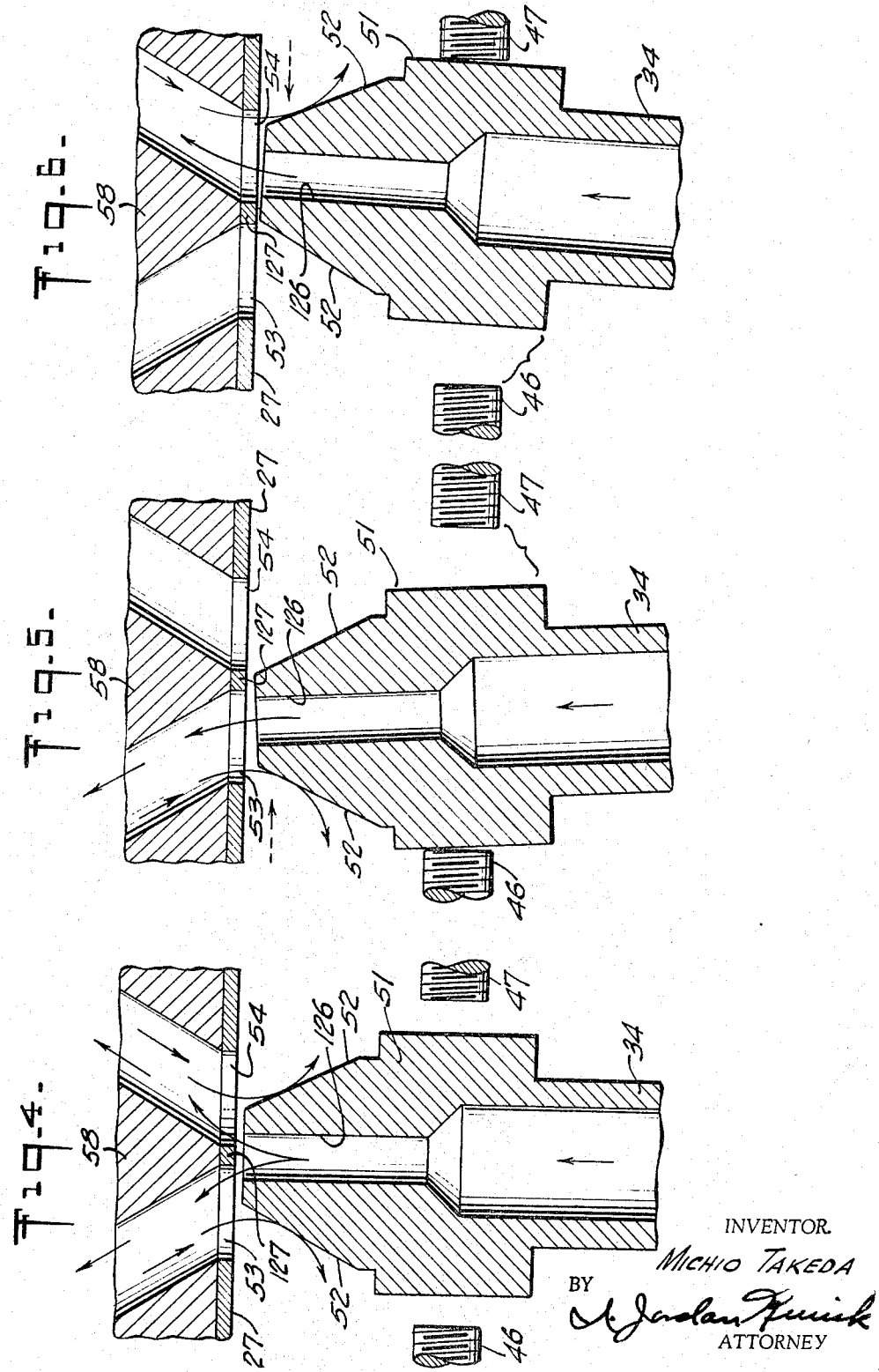

3,282,283
**HYDRAULIC REGULATING SYSTEM
AND APPARATUS**
Michio Takeda, Toyonaka, Japan (% Gocko Regulator
 Co., Ltd., Dojima Bldg., 50 Kinugasa-cho, Kita-ku,
 Osaka, Japan)
Filed Dec. 23, 1963, Ser. No. 332,682
16 Claims. (Cl. 137—83)

This invention relates generally to regulating apparatus and more particularly to an improved electro-hydraulic regulator or feedback mechanism which is adapted to adjust and control the operation of various types of processing machines and the like.

The invention is especially useful in controlling machines handling elongated sheet materials such as cloth, paper, cellophane, metal fabrications, foils and rubber when they are in the process of being continuously stentered, wound, laminated, dried, printed, dyed, slit, or the like. Such moving sheet materials must be maintained in locus or on an even course without deviation to either side.

One prior feedback arrangement for keeping sheet materials on course has been the diaphragm or moving coil operated, continuously flowing, hydraulic jet pipe apparatus which in response to deviations in either direction of the sheet material, controls a hydraulic work piston for returning the sheet material back on course. After the work piston has been readjusted to the neutral position, the pivoting hydraulic jet pipe has been returned to its neutral position by mechanical springs which have the serious defects of causing vibration or hunting due to hysteresis effects and the like. Any vibration or hunting action on the part of the hydraulic jet pipe is reflected by a concomitant action on the part of the work piston which, in turn, upsets the otherwise straight course movement of the sheet material that is being processed.

According to the improved feedback system of the present invention, the disadvantages of vibration and hunting are obviated by dispensing with mechanical spring return mechanisms altogether and by providing a novel valve element and bleed control system working in conjunction with a reflex jet stream operating on the hydraulic jet pipe to return both the valve element and jet pipe directly to their neutral positions without overrunning, vibration or hunting, and maintaining them there in a stabilized position until error or deviation signals are received for further corrective action.

The invention herein comprises a pair of reciprocally operating hydraulic systems which are normally maintained under equal pressure by a continuously flowing hydraulic jet stream divided between said two systems. When the mass to be controlled deviates from its predetermined static or moving locus in either of two opposite directions, this deviation is sensed and causes the jet stream to deviate from its normal position of equilibrium and to increase the pressure in a corresponding one of said two hydraulic systems whereby the pressure in one system increases and the pressure in the other system decreases. The resultant differential in pressure between the two hydraulic systems is imposed as a force upon a valve element movably positioned between and operated upon by said two hydraulic systems.

The valve element also controls a third intermediate hydraulic system which is coupled to opposite sides of a work element connected to the mass to be controlled. According as the valve element is moved in one direction or the other, the hydraulic power from the third hydraulic system is caused selectively to move the work element in one corresponding direction or the other whereby the mass is returned to its predetermined locus.

A salient feature of the present invention involves the incorporation of a bleed control port in each of the first two mentioned hydraulic systems and a pair of lands on the valve element cooperating with respective bleed ports whereby the restoration of the valve element to a central neutral location or equilibrium position is brought about without vibration and without the characteristics of hunting exhibited by prior art mechanisms.

Anti-hunting action is also manifested in the return of the jet stream to its neutral central location where equal pressures are again induced in the first two mentioned hydraulic systems. By virtue of the novel conical nozzle on the pivoting jet pipe that transmits the jet stream, a reverse reflex hydraulic flow of fluid from that hydraulic system in which the pressure had been increased impinges upon one side of said nozzle to cause the jet pipe to return to its central neutral location where it is maintained in equilibrium by the two reverse reflex streams from both of the first mentioned two hydraulic systems.

The receiving holes through which the jet stream is projected into the first two mentioned hydraulic systems are located slightly spaced apart from each other opposite the jet nozzle when the latter is in its neutral location. Also the respective bleed control ports have equal diameters that are considerably smaller than the equal diameters of the receiving holes whereby the reverse reflex pressure streams are caused to flow back upon the conical nozzle of the jet pipe.

Simultaneously the valve element cooperates with the respective bleed control ports upon its return to its neutral location and varies the flow therethrough whereby the equalization of pressures in the two first mentioned hydraulic systems is brought about asymptotically without overrunning.

The coupling between the third hydraulic system and the work element constitutes a pair of outlet ports in the valve body containing the valve element, said outlet ports being connected to opposite respective ends of a cylinder in which the work element as a piston is moved by differential in pressure between one end of the cylinder and the other. A second pair of lands on the valve element cooperates with the respective outlet ports alternatively when said valve element moves in one direction or the other to increase the pressure on one side of the work piston and to decrease the pressure on the other. Suitable drain ports are provided for the third hydraulic system which are controlled by said second pair of lands for permitting the respective increase and decrease in hydraulic pressure on opposite sides of said work piston.

As a result of the controlled operation of the bleed control ports and of the reflex reverse streams that are operative upon the conical nozzle of the jet pipe, the regulating apparatus herein is capable of producing an accurate feedback operation for correcting any deviation of a mass from a predetermined locus in a manner that said correcting action takes place asymptotically without vibration and hunting. The return of the mass to its predetermined locus is quickly and accurately damped and decelerated by the apparatus herein so that there is no overrunning of the mass to a point beyond the locus which would otherwise require a further corrective action. According to the system of the present invention, the dislocated mass is caused to approach and arrive precisely and rapidly at its predetermined locus in an asymptotic manner rather than in an undesirable damped sine wave manner with prolonged oscillation on both sides of the predetermined locus.

Still other objects and advantages of the invention will be apparent from the specification.

The features of novelty which are believed to be characteristic of the invention are set forth herein and will best be understood, both as to their fundamental principles and as to their particular embodiments, by reference to the specification and accompanying drawings, in which:

FIG. 4 is a greatly enlarged fragmentary view of a portion of the components shown in FIG. 1, showing the jet pipe nozzle in the neutral central position;

FIG. 5 is similar to FIG. 4, showing the jet pipe nozzle in the position as represented in FIG. 2; and FIG. 6 is similar to FIGS. 4 and 5, showing the jet pipe nozzle in the position as represented in FIG. 3.

Figure 1:
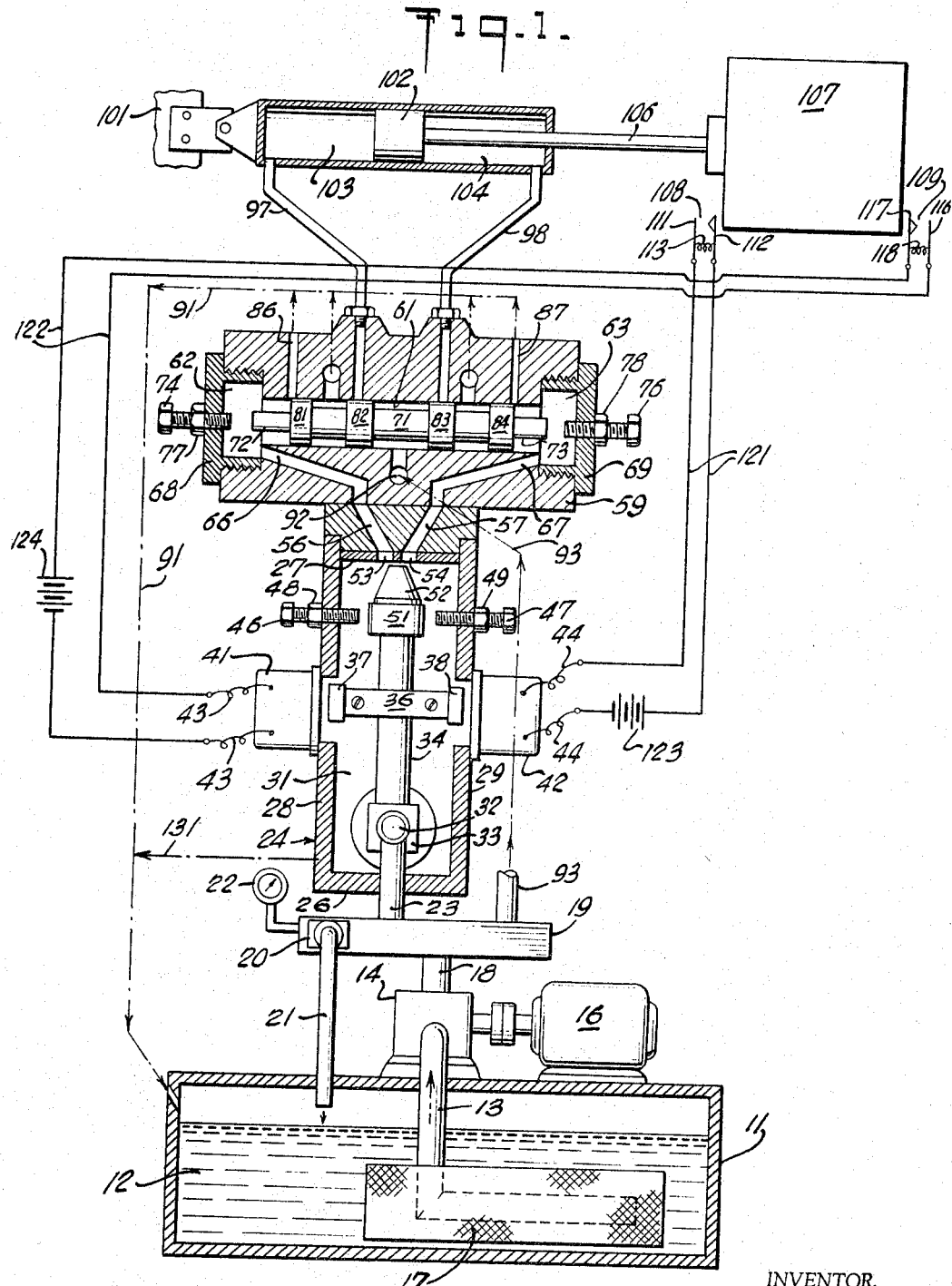
FIGURE 1 is a diagrammatic repesentation of an embodiment of the present invention, some parts being shown in elevation, some parts in section, and some parts being shown schematically in dotted outlines.

Referring now to the drawings in detail, and particularly to FIG. 1, the system of the present invention comprises a reservoir or supply tank 11 containing a supply of oil or other suitable hydraulic fluid 12.

Oil is drawn from tank 11 through pipe 13 by means of pump 14 driven by electric motor 16. The end of pipe 13 in tank 11 may be surrounded by a suitable filter 17, or the like. Pump 14 feeds oil under pressure through pipe 18 to a distributor 19, the latter being provided with an adjustable relief valve 20 whereby excessive hydraulic pressure is relieved through drain pipe 21 connected between said distributor and tank 11. A pressure gauge 22 having a suitable dial and needle pointer is connected with the interior of distributor 19 to provide a visible indication of the pressure therein and to permit the operator to adjust the pressure in accordance with the requirements of the operation of the apparatus.

That portion of FIG. 1 described to this point is represented as a side view with tank 11 shown in vertical cross section. The remainder of FIG. 1 may be considered as viewed from the top, with some parts in section and some parts being shown in elevation.

Leading from distributor 19 is a feed pipe 23 which extends over and through the top (not shown) of a boxlike enclosure, generally designated 24, which comprises rear wall 26, front wall 27 and side walls 28 and 29, enclosing hydraulic jet chamber 31.

Positioned in hydraulic jet chamber 31 near wall 26 is a vertical pipe 32 which is rotatable on its vertical axis between a pair of spaced apart bearings 33, only the top bearing being shown in FIG. 1. Connected to and communicating with the interior of pipe 32 intermediate its ends is one end of a horizontal jet pipe 34, said vertical pipe 32 serving as a pivot mounting for said jet pipe which is normally positioned centrally and longitudinally in respect of chamber 31. Feed pipe 23 is connected by suitable leak-tight means to vertical pipe 32 whereby hydraulic fluid 12 is transmitted under pressure into and through jet pipe 34.

Mounted upon jet pipe 34 intermediate its ends, is a crossbar 36 to the ends of which are connected magnetic armatures 37 and 38, respectively. Mounted over suitable apertures in side walls 28 and 29 are solenoids 41 and 42, respectively, which are energized by way of paired lead wires 43 and 44, respectively. The selective energization of either solenoid 41 or 42 is effective to activate either armature 37 or 38, respectively, to bring about the horizontal pivotal motion of jet pipe 34 in one direction or the other as required. The horizontal pivotal movement of jet pipe 34 is limited by the inner ends of adjustable stop bolts 46 and 47, threadably extending through walls 28 and 29, respectively, said bolts being fixed in their adjusted positions by nuts 48 and 49, respectively.

The forward free end of jet pipe 34 is provided with a nozzle 51 having a truncated conical tip 52, the flat open end of which is spaced apart a short distance from the inner surface of front wall 27. In some embodiments this distance is a maximum of about 1 mm.

Located in front wall 27 at the level of the mouth of nozzle tip 52 is a pair of closely spaced apart small receiving holes 53 and 54 which extend through said wall and communicate with diverging channels 56 and 57, respectively, in diffuser block 58 mounted in juxtaposition to wall 27.

Connected intimately by suitable means to diffuser block 58 is a valve housing or body 59 having an elongated valve chamber 61, the opposite ends of which terminate in pressure chambers 62 and 63, respectively. Channel 66 in body 59 establishes communication between diffuser channel 56 and pressure chamber 62, while channel 67 in body 59 establishes communication between diffuser channel 57 and pressure chamber 63. Pressure chambers 62 and 63 are enclosed by threaded hollow cap nuts 68 and 69, respectively.

Movable longitudinally in valve chamber 61 is a valve element 71, whose opposite ends terminate in outwardly extending stubs 72 and 73, respectively. The longitudinal movement of element 71 is limited by the outer ends of stubs 72 and 73 abutting the inner ends of adjustable bolts 74 and 76, respectively, the latter extending threadably through caps 68 and 69 and being secured in selected adjusted positions by nuts 77 and 78, respectively.

Valve element 71 has four spaced apart annular lands 81, 82, 83 and 84 extending outwardly from the surface thereof, said lands slidably and intimately engaging the inner surface of valve chamber 61. Valve body 59 is provided with two spaced apart small bore control ports 86 and 87, and with a pair of spaced apart drain ports 88 and 89, all of said ports communicating with the interior of valve chamber 61. Ports 86, 87, 88 and 89 are all connected to overflow pipe 91 which returns hydraulic fluid to tank 11, FIG. 1. Located centrally of valve body 59 is an inlet pressure port 92 which communicates with the interior of valve chamber 61. Inlet port 92 is connected to one end of pipe 93, the other end of which is connected with distributor 19.

A pair of spaced apart outlet pressure ports 94 and 96 are located in valve body between drain ports 88 and 89, the inner ends of said pressure ports communicating with valve chamber 61. Joined to the outer ends of ports 94 and 96 are connecting pipes 97 and 98, respectively, the outer ends of which are connected to the opposite respective ends of work cylinder 99 suitably mounted on a stationary support 101. Movable reciprocably within cylinder 99 is a work piston 102 which divides the interior of said cylinder into separate chambers 103 and 104 with which connecting pipes 97 and 98 communicate, respectively, FIG. 1.

Connected to piston 102 is one end of piston rod 106 which extends by way of a leak-tight seal through an end wall of cylinder 99, the other end of said rod being connected to mass 107 whose location is controlled by the apparatus and system of the present invention. Piston 102 as well as mass 107 are movable to the right or left according as pressure is increased in chamber 103 while being reduced in chamber 104, or vice versa.

Mounted on a suitable bracket or platform, not shown, near mass 107 is a pair of spaced apart normally open switches 108 and 109. Switch 108 has a stationary contact 111 and a movable contact 112 held in the normally open position by spring 113, or the like. Switch 109 has a stationary contact 116 and a movable contact 117 held in the normally open position by spring 118 or the like.

Contacts 111 and 112 of switch 108 are connected by lead lines 121 to lead wires 44 of solenoid 42, while contacts 116 and 117 of switch 109 are connected by lead lines 122 to lead wires 43 of solenoid 41. A source 123 of electric power is provided in one lead line 121, while another source 124 of electric power is provided in one lead line 122. Said sources of electric power may either be direct or alternating current depending upon the choice of suitable or desired electric components in the system.

Instead of being mechanically operated, lever switches 108 and 109 may be replaced by photoelectric cells or other suitable types of normally open circuit closing momentary switches which are responsive to the movement of mass 107 in a predetermined direction to a predetermined distance to cause solenoids 41 and 42 to be selectively energized. Switches 108 and 109 are located in respect of mass 107 whereby the latter in moving a predetermined distance in one direction or the other will impinge upon and cause either movable contact 112 or 117 to close its respective circuit.

It is understood that instead of direct action by mass 107 upon switches 108 and 109, suitable intermediary means such as feelers, mechanical, electrical or hydraulic linkages or the like may be provided to sense the movement or deviation of mass 107 in either direction and to translate it into motive power for actuating said switches selectively.

In operation, oil is pumped through jet pipe 34 and emerges from the mouth 126 of nozzle 51 in a high velocity stream directed at wall 27 in the area between receiving holes 53 and 54. See FIGS. 1 and 4. The jet stream is substantially evenly divided by partition 127 between said receiving holes into two separate pressure streams, one of which flows through channels 56 and 66 into pressure chamber 62, the other pressure stream flowing through channels 57 and 67 into pressure chamber 63. Mouth 126 of nozzle 51 is sufficiently wider than partition 127 to provide said two separate pressure streams.

When valve element 71 is centrally or neutrally located within valve chamber 61, lands 82 and 83 on said element effectively block off communication between chamber 61 and outlet pressure ports 94 and 96, respectively. Thus hydraulic fuel being supplied under pressure through pipe 93 and port 92 into that portion of chamber 61 between lands 82 and 83 performs no work, the excess pressure being accommodated by relief valve 20 in distributor 19.

Also, when valve element 71 is in the neutral position, shown in FIG. 1, lands 81 and 84 only partially block control ports 86 and 87, respectively. Since the diameters of control ports 86 and 87 are each approximately between one third (⅓) to one-half (½) the diameter of receiving holes 53 and 54, and of channels 56, 66 and of channels 57, 67, respectively, drainage through said control ports is restricted. Thus, back pressure in chambers 62 and 63 is built up and is manifested by a reverse hydraulic flow therefrom through channels 66, 56 and channels 67, 57, and through receiving holes 53 and 54, respectively, in the form of two reverse hydraulic streams into jet chamber 31, as shown in FIG. 4.

The reverse hydraulic streams from receiving holes 53 and 54 impinge with substantially equal force upon opposite sides of conical nozzle tip 52 thereby maintaining jet pipe 31 normally stabilized in position with mouth 126 of its nozzle 51 directed centrally between receiving holes 53 and 54. The continued thrust of the jet stream from nozzle 51 into receiving holes 53 and 54 in conjunction with action of the reverse hydraulic streams establishes an equal pressure within pressure chambers 62 and 63 whereby valve element 71 is also maintained in equilibrium in its neutral position while control ports 86 and 87 are bleeding equal but restricted amounts of hydraulic fluid from said respective pressure chambers.

This stabilized neutral condition is maintained while mass 107 remains within its prescribed bounds and does not actuate switch 108 or 109. If mass 107 represents a continuous sheet of fabric or the like that is moving in a predetermined path through one or more processing steps, then its continued movement without deviation from said path, which would otherwise actuate switch 108 or 109, preserves the neutral status of jet pipe 31 and of valve element 71 in valve chamber 61.

Figure 2:
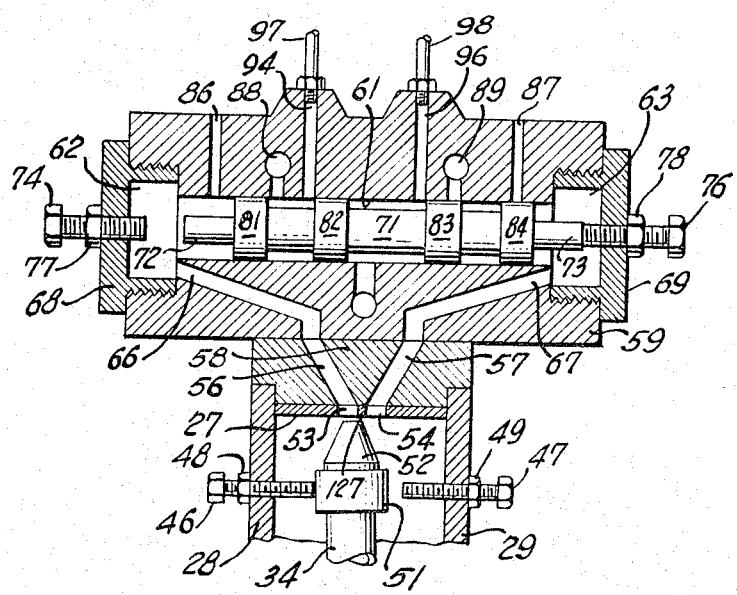
FIG. 2 is an enlarged fragmentary view of a portion of the regulator system showing the parts thereof in one operating position.

When mass 107 moves to the right outside its prescribed bounds and actuates lever 117 to close switch 109, solenoid 41 becomes energized and attracts armature 37 whereby jet pipe 34 is moved pivotally to the left, said leftward movement of said jet pipe being limited by the inner end of stop bolt 46. In this position, as shown in FIGS. 2 and 5, mouth 126 of nozzle 51 is now positioned opposite receiving hole 53 and the jet stream from jet pipe 34 is directed principally through channels 56 and 66 into pressure chamber 62 where hydraulic pressure increases. Since the jet stream from jet nozzle 51 no longer is directed into pressure chamber 63, the hydraulic pressure in the latter decreases. By the foregoing action, valve element 71 is urged to the right (FIG. 2) until its motion is stopped by the outer end of stub 73 abutting against the inner end of bolt 76. In this position land 83 has also moved to the right and now permits communication between the interior of chamber 61 and outlet pressure port 96. The movement of valve element 71 in the foregoing operation is very rapid due to the fact that the inflow of hydraulic fluid into pressure chamber 62 is much greater than the outflow therefrom through bleed control port 86.

At this stage, hydraulic fluid entering the central portion of valve chamber 61 by way of port 92 flows under pressure through pressure port 96 and pipe 98 into chamber 104 of cylinder 99. By this action the pressure in chamber 104 increases while the pressure in chamber 103 decreases, the latter effect being accomplished by land 82 having moved to the right of port 94 whereby hydraulic fluid from chamber 103 flows into valve chamber 61 and from said valve chamber through drain port 88. Accordingly, by this change in the relative hydraulic pressures in chambers 103 and 104 of cylinder 99, piston 102 is moved to the left thereby moving mass 107 to the left also. By this action, lever 117 of switch 109 is released thereby opening the circuit to solenoid 41 which becomes de-energized and releases armatures 37.

The previous leftward movement of jet pipe 34 having been limited by the inner end of bolt 46, mouth 126 of nozzle 51 is slightly off-center in respect of receiving hole 53 (FIG. 5) whereby the reverse hydraulic stream emerging from receiving hole 53 impinges upon the left side of conical surface 52 of said nozzle. When jet pipe 34 has been released by solenoid 41, the reverse hydraulic stream impinging upon the left side of nozzle 51 causes jet pipe 34 to move pivotally to the right until it reaches its central location where mouth 126 of nozzle 51 is located directly opposite partition 127 (FIG. 4), in which location the reverse hydraulic streams from both receiving holes 53 and 54, impinging upon opposite sides of nozzle 51 with equal force, maintain said nozzle in equilibrium between them.

Jet pipe 34 having resumed its central neutral location, the jet stream from nozzle 51 again projects equal portions of hydraulic fluid into both receiving holes 53 and 54 at equal pressure. In the course of nozzle 51 returning to its central location, hydraulic pressure in chamber 63 increases while pressure in chamber 62 decreases, causing valve member 71 to return to the left. This reversal of conditions takes place rapidly for the reason that when valve 71 had been moved to the right, bleed control port 87 had been completely blocked off by land 84 (FIG. 2). Thus, when equal jet streams are now being transmitted towards and into pressure chambers 62 and 63, the increase in the pressure in chamber 63 will be considerably more rapid, the differential in pressure being increased by the gradual lessening of the jet thrust into chamber 62 as nozzle moves from its extreme left position towards its neutral center.

As valve member 71 moves back toward its central neutral position, land 81 gradually closes off a portion of bleed control port 86 while land 84 gradually opens bleed control port 87 until a state of equilibrium is maintained where lands 81 and 84 only partially close off ports 86 and 87, respectively, so that equal restricted amounts of hydraulic fluid are being bled from chambers 62 and 63 which are also now receiving equal pressure thrusts from the jet stream emerging from nozzle 51.

While valve member 71 has been returning from its extreme right position towards its central neutral position during the foregoing operations, and while hydraulic fluid has continued to enter under pressure into the central portion of valve chamber 61, lands 82 and 83, moving to the left, gradually have been closing ports 94 and 96, respectively, whereby piston 102 has decelerated in its movement toward the left until it stops when said ports have finally been completely blocked off by said lands which are now realigned in their positions as shown in FIG. 1.

The dimensions of the various components of the apparatus described hereinbefore have been selected and coordinated with each other whereby the return of nozzle 51 and valve member 71 to their central neutral positions also brings about the return of piston 102 to a correspondingly central neutral position within cylinder 99, whereby mass 107 is also returned to its desired operating position from which it had temporarily deviated and whose position has been corrected by means of the foregoing feedback mechanisms.

Also bolts 46, 47, 74 and 76 are each adjustable so that their inner ends are properly located to delimit the lateral movements of jet nozzle 51 and valve member 71, respectively, in either direction so that the feedback action that is transmitted through the loops comprising switches 108 and 109, solenoids 41 and 42, piston 102, and connecting rod 106 is properly coordinated and correlated to produce the desired end result of relocating mass 107 either to a predetermined desired position or controlled in a predetermined desired path.

Figure 3:
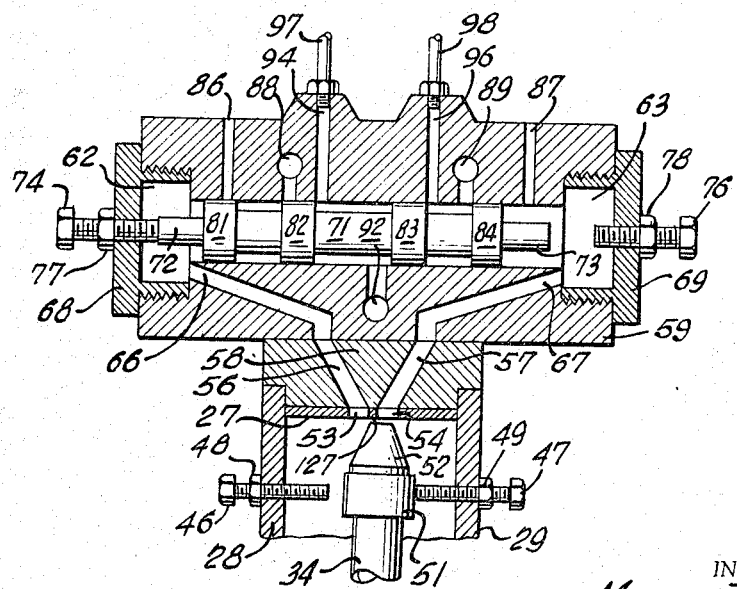
FIG. 3 is similar to FIG. 2 showing the same parts in the opposite operating position.

When mass 107 deviates to the left from its desired neutral position, the system performs all of the same functions as described hereinbefore, except that all of the actions of the various components take place in opposite respective directions. In this case, switch 108 is closed energizing solenoid 42 which attracts armature 38 to cause jet pipe 34 to move pivotally to the right, nozzle 51 abutting the inner end of bolt 47, whereby the major force of the jet stream is projected into pressure chamber 63 causing valve element 71 to move to the left, FIGS. 3 and 6. By this action the improper deviation of mass 107 to the left is corrected by the concomitant movement of piston 102 to the right until a neutral condition of equilibrium is reestablished.

In this case, mouth 126 of nozzle 51 projects the main force of the jet stream through channels 57 and 67 into pressure chamber 63 to cause valve member 71 to move to the left until the outer end of its stub 72 abuts the inner end of bolt 74. See FIGS. 3 and 6. In this position of valve member 71, hydraulic fluid entering under pressure through port 92 into the central portion of valve chamber 61 is transmitted under pressure through port 94 and pipe 97 to chamber 103 in cylinder 99 while hydraulic fluid from chamber 104 drains through pipe 98 and port 96 into valve chamber 61 and out of said valve chamber through port 89. Land 81 blocks off bleed control port 88 preventing the latter from draining hydraulic fluid from chamber 61, while land 83 isolates port 96 from the pressure section of valve chamber 61. Thus the simultaneous increase and decrease in chambers 103 and 104, respectively, causes the movement of piston 104 as well as of mass 107 to the right, thereby releasing lever 112 and permitting switch 108 to open whereby solenoid 42 is de-energized to permit free pivoting action on the part of jet pipe 34.

Although land 84 has completely retracted from port 87 permitting fluid to drain in a restricted volume from chamber 63, a sufficient volume of hydraulic fluid is projected by jet pipe 34 into said chamber to maintain a sufficiently high pressure to cause a reverse stream to return and flow out of receiving hole 54 and to impinge upon the right side of conical surface 52 of nozzle 51, see FIG. 6. By this action nozzle 51 and accordingly jet pipe 34 are urged pivotally leftwards whereby the force of the jet stream into receiving hole 54 diminishes thereby reducing the pressure in chamber 63, and an increasing amount of the jet stream is projected into receiving hole 53 thereby increasing the pressure in chamber 62. Thus the relative increase and decrease of pressure in respective chambers 62 and 63 causes valve member 71 to move toward its central neutral position.

As the rightward movement of valve member 71 takes place, bleed control port 86 is gradually opened by land 81 while bleed control port 87 is gradually closed by land 84. The simultaneous opening and closing of respective ports 86 and 87 effectively decelerate both the increase in pressure in chamber 62 and the decrease in pressure in chamber 63 whereby the movement of valve member 71 to the right is also decelerated or damped asymptotically until the latter reaches its central neutral position where it is stabilized by virtue of a controlled bleeding of equal amounts of hydraulic fluid from both chambers 62 and 63 due to the equal partial restriction of said ports by lands 81 and 84, respectively, FIG. 1.

As jet nozzle 51 also approaches from the left toward the central neutral position, the reverse streams from receiving holes 53 and 54 become equalized and impinge with equal force upon the opposite sides of surface 52 of nozzle 51 to maintain the latter in equilibrium centrally between them, while the jet stream from nozzle 51 is projected in equal amounts and with equal force into said respective holes, FIGS. 1 and 4.

When valve member 71 is in its central neutral position, as shown in FIG. 1, lands 82 ad 83 seal off ports 94 and 96. Since chambers 103 and 104, pipes 97 and 98 and ports 94 and 96 are filled with hydraulic fluid, said lands act as an effective and powerful hydraulic brake, stabilizing the positions of piston 102 and of mass 107, whereby the latter is resistant to any movement imposed by external forces. This braking action is reinstituted after any deviation on the part of mass 107 has taken place and has been corrected by the feedback mechanisms described hereinbefore.

In prior art mechanisms, a mechanical spring has been utilized to return the hydraulic jet pipe back to its neutral central position, when either solenoid has been de-energized. Such springs have hysteresis characteristics and inherent vibration periodicities which cause said jet pipes to overrun their neutral central objectives and to "hunt" in the manner of an alternating damped sinusoidal wave about said central neutral positions until the time consuming vibration ceases. Mechanical springs are also subject to gradually increasing fatiguing effects and to failure, not only reducing the efficiency of the machine, but also subjecting it to breakdown.

The undesirable disadvantages of mechanical springs are absent from the apparatus and system herein because of the employment of the bleed control ports 86 and 87, which, operating in conjunction and in simultaneous reflex action with jet pipe 34 and valve member 71, bring about a rapid asymptotic return of both said jet pipe and said valve member to their respective neutral central positions without overriding, vibration or hunting. Thus jet pipe 34 and valve member 71 become hydraulically stabilized in the shortest possible time after a deviation of mass 107 has been sensed and corrected. Due to the anti-hunting asymptotic return of both valve member 71 and jet pipe 34 to their respective neutral central locations, mass 107 also returns to its normal predetermined locus asymptotically, without vibration and without any manifestation of hunting or overrunning beyond said locus.

In some embodiments of the present invention, there may be a differential established by suitable means between the oil pressures in jet pipe 34 and in pipe 93 supplying hydraulic pressure for ports 94 and 96, selectively. Low hydraulic pressure may be sufficient for the jet pipe output to actuate valve member 71, while higher hydraulic pressure may be useful for supplying power through valve ports 94 and 96 to work piston 102 in either direction selectively.

Overflow oil in jet chamber 31 may be drained through a suitable outlet port, not shown, which is connected by means of pipe 131 to return pipe 91 for transmitting said overflow back to tank 11.

What is claimed is:

1. A regulating apparatus comprising a housing, a first hydraulic system and a second hydraulic system in said housing, a pivotable jet pipe near said housing, a source of hydraulic power for continuously transmitting hydraulic fluid under pressure and causing a jet stream of hydraulic fluid to emerge continuously from a free end of said jet pipe, a first receiving hole for said first hydraulic system, a second receiving hole for said second hydraulic system, said first and second receiving holes having equal diameters and being located slightly spaced apart from each other, a truncated conical nozzle on the free end of said jet pipe having a flat end from which said jet stream is discharged, the apex of said nozzle being normally positioned closely opposite and intermediate said two receiving holes for projecting said jet stream into said two holes simultaneously, a first bleed control port for said first hydraulic system, a second bleed control port for said second hydraulic system, both of said bleed control ports being substantially smaller than said respective first and second receiving holes whereby back pressure is induced in said first and second hydraulic systems during the flow of said jet stream to cause reflex reverse hydraulic streams to flow out of said receiving holes and to impinge upon opposite respective sides of said conical nozzle with sufficient force normally to maintain the free end of said jet pipe in equilibrium by hydraulic action only at a neutral position intermediate both said holes, and a valve positioned in said housing between said first and second hydraulic systems and cooperating with said first and second bleed control ports for varying the amount of hydraulic fluid being drained through said respective bleed control ports.

2. Apparatus according to claim 1 wherein said nozzle apex is spaced apart from said two receiving holes at a distance in the order of one millimeter.

3. Apparatus according to claim 1 wherein said nozzle apex is spaced apart from said two receiving holes at a maximum distance of one millimeter.

4. Apparatus according to claim 1 wherein the diameters of said bleed control ports are equal to each other and are approximately between one-third to one-half the diameter of said first and second receiving holes.

5. Apparatus according to claim 1 and further comprising first and second lands on said valve, said first and second lands partially restricting the apertures of the first and second bleed control ports when said valve is in a position of equilibrium between said first and second hydraulic systems and when said nozzle is in a neutral position intermediate both of said first and second receiving holes.

6. Apparatus according to claim 5 and further comprising third and fourth spaced apart lands on said valve, said lands isolating said first and second hydraulic systems from each other and defining a third hydraulic system in said housing, first and second work ports in said housing communicating with said third hydraulic system, said third and fourth lands cooperating with the respective first and second work ports alternatively to establish communication between said third hydraulic system and said first and second work ports.

7. Apparatus according to claim 1 and further comprising first and second electric signal operated control means located on opposite sides of said jet pipe, the alternate energization of either of said control means causing said pipe to move pivotally toward a corresponding one of said first and second receiving holes, the de-energization of said energized control means causing the reverse reflex streams from said receiving holes to move said nozzle toward a stabilized neutral central position between said two receiving holes.

8. Apparatus according to claim 7 and further comprising a pair of stop elements located on opposite sides of said jet pipe, said stop elements cooperating with said pipe to prevent said nozzle from moving excessively in either direction from its normal, neutral position between said two receiving holes when either of said signal operated control means is energized.

9. Apparatus according to claim 1 wherein the jet stream from said pipe is normally projected into said two receiving holes in equal amounts and with equal force.

10. Apparatus according to claim 1 wherein said valve is operative to increase the aperture of one of said bleed control ports and to decrease the aperture of the other of said bleed control ports according as said jet pipe is moved pivotally to either of two opposite directions from its normal, central position between said two receiving holes.

11. A regulating apparatus comprising a housing, a first hydraulic system and a second hydraulic system in said housing, a pivotable jet pipe near said housing, a truncated conical nozzle having a flat end on the free end of said jet pipe, a first receiving hole for said first hydraulic system, a second receiving hole for said second hydraulic system, the apex of said nozzle being normally positioned closely opposite and intermediate said two receiving holes for projecting a hydraulic jet stream into said two holes simultaneously, first bleed control means for said first hydraulic system, second bleed control means for said second hydraulic system, both of said bleed control means being constricted in dimension normally to transmit substantially less hydraulic fluid than said two respective receiving holes to cause reflex reverse hydraulic streams to flow from said receiving holes and to impinge upon opposite respective sides of said conical nozzle normally to maintain said nozzle in equilibrium at a neutral central position intermediate both said holes without any external spring means.

12. Apparatus according to claim 11 and further comprising a valve in said housing located between said first and said second hydraulic systems and movable therein in accordance with any differential in pressure that exists between said respective hydraulic systems, a first land on said valve cooperating with said first bleed control means, a second land on said valve cooperating with said second bleed control means, said lands partially constricting their respective bleed control means when said valve is normally in a neutral central position between said hydraulic systems, one of said lands enlarging the passage of its respective bleed control means and the other of said lands diminishing the passage of its respective bleed control means according as said valve moves in either one of opposite directions between said two hydraulic systems.

13. Apparatus according to claim 11 and further comprising third and fourth spaced apart lands on said valve, said third and fourth lands defining between them a third hydraulic system, first and second spaced apart work outlets in said housing, said third land blocking said first work outlet and said fourth land blocking said second work outlet when said valve is normally located in its neutral central position between said first and second hydraulic systems, said third and fourth lands alternatively establishing communication between said third hydraulic system and the respective first and second work outlets according as said valve moves in either of opposite directions between said first and second hydraulic systems.

14. Apparatus according to claim 11 and further comprising first and second electric signal operated control means located on opposite sides of said jet pipe, the alternate energization of either of said control means causing said pipe to move pivotally toward a corresponding one of said first and second receiving holes, the de-energization of said energized control means causing the reverse reflex streams from said receiving holes to move said nozzle toward a neutral central position between said two receiving holes.

15. Regulating apparatus comprising a housing, a first hydraulic system and a second hydraulic system in said housing, a pivotable jet pipe near said housing, a first receiving hole for said first hydraulic system, a second receiving hole for said second hydraulic system, the free end of said jet pipe having a truncated conical nozzle with a flat end thereon and being normally positioned opposite and intermediate said two receiving holes for projecting a hydraulic jet stream into said two holes simultaneously, first bleed control means for said first hydraulic system, second bleed control means for said second hydraulic system, both of said bleed control means being constricted in dimension normally to transmit substantially less hydraulic fluid than the two said respective receiving holes to cause reflex reverse hydraulic streams to flow from said receiving holes and to impinge upon opposite respective sides of said free end of said jet pipe normally to maintain said end of said jet pipe in equilibrium at a stabilized neutral central position intermediate both said receiving holes by hydraulic action only, a valve member movable reciprocably between said two hydraulic systems within said housing, a first land on said valve member normally partially blocking said first bleed means, a second land on said valve member normally partially blocking said second bleed means when said valve member is in its normal, neutral central position in said housing, the movement of said valve member in either direction causing one of said lands to enlarge its respective bleed control means at the same time as said second land decreases its respective bleed control means.

16. Regulating apparatus comprising a first hydraulic system, a second hydraulic system, a pivotable jet pipe having a truncated conical nozzle with a flat end thereon for projecting a hydraulic jet stream into both said first and second hydraulic systems simultaneously, first bleed control means for said first hydraulic system, second bleed control means for said second hydraulic system, both said bleed control means continuously maintaining control pressures in their respective hydraulic systems to produce reflex reverse hydraulic streams flowing back upon said jet pipe normally to maintain the latter in a neutral central position by hydraulic action only between said first and second hydraulic systems and valve means movable between said first and second hydraulic systems and normally positioned in a central, neutral location therebetween, said valve means cooperating with said first and second bleed control means when moving in either direction in response to a differential in pressure between said two hydraulic systems automatically to decrease hydraulic flow through one of said bleed means and simultaneously to increase hydraulic flow in the other of said bleed means.

References Cited by the Examiner
UNITED STATES PATENTS

| | | | |
|---|---|---|---|
| 1,158,029 | 10/1915 | Dantsizen | 91—390 |
| 1,799,112 | 3/1931 | Miedbrodt | 91—40 |
| 2,047,922 | 7/1936 | Seligmann | 137—83 |
| 2,273,600 | 2/1942 | Specht | 137—83 X |
| 2,485,094 | 10/1949 | Gunderson | 91—3 |
| 2,649,841 | 8/1953 | Jacques | 91—363 |
| 2,742,022 | 4/1956 | Jacques | 93—3 |
| 2,768,637 | 10/1956 | Sweeney | 137—83 |
| 2,835,265 | 5/1958 | Brandstadter | 91—51 X |
| 2,864,339 | 12/1958 | Sazavsky | 91—3 |
| 2,966,890 | 6/1961 | Panissidi | 91—361 |
| 2,990,839 | 7/1961 | Ray | 137—83 |
| 2,993,477 | 7/1961 | Panissidi | 91—52 X |
| 2,996,072 | 8/1961 | Atchley | 137—83 |
| 3,011,505 | 12/1961 | Reip | 137—83 |
| 3,026,892 | 3/1962 | Tsein | 91—459 X |

MARTIN P. SCHWADRON, *Primary Examiner.*

SAMUEL LEVINE, FRED E. ENGELTHALER,
*Examiners.*

P. T. COBRIN, *Assistant Examiner.*